US012319798B2

United States Patent
Okamoto et al.

(10) Patent No.: US 12,319,798 B2
(45) Date of Patent: Jun. 3, 2025

(54) WATER-SOLUBLE FILM AND PACKAGING

(71) Applicant: KURARAY CO., LTD., Okayama (JP)

(72) Inventors: Minoru Okamoto, Okayama (JP); Sayaka Shimizu, Okayama (DE); Osamu Kazeto, Okayama (JP)

(73) Assignee: KURARAY CO., LTD., Okayama (JP)

( * ) Notice: Subject to any disclaimer, the term of this patent is extended or adjusted under 35 U.S.C. 154(b) by 603 days.

(21) Appl. No.: 17/505,981

(22) Filed: Oct. 20, 2021

(65) Prior Publication Data

US 2022/0041824 A1     Feb. 10, 2022

Related U.S. Application Data

(63) Continuation of application No. PCT/JP2020/017286, filed on Apr. 22, 2020.

(30) Foreign Application Priority Data

Apr. 23, 2019   (JP) ................... 2019-082218

(51) Int. Cl.
| | |
|---|---|
| C08J 5/18 | (2006.01) |
| B65D 65/46 | (2006.01) |
| C08F 16/06 | (2006.01) |
| C08K 5/05 | (2006.01) |
| C08K 5/42 | (2006.01) |
| C08K 5/521 | (2006.01) |
| C11D 17/04 | (2006.01) |

(52) U.S. Cl.
CPC ............... *C08J 5/18* (2013.01); *B65D 65/46* (2013.01); *C08F 16/06* (2013.01); *C08K 5/05* (2013.01); *C08K 5/42* (2013.01); *C08K 5/521* (2013.01); *C11D 17/043* (2013.01); *C08J 2329/04* (2013.01)

(58) Field of Classification Search
CPC .......... B32B 2329/04; B29K 2029/04
USPC .............................. 428/35.4, 36.6
See application file for complete search history.

(56) References Cited

U.S. PATENT DOCUMENTS

2003/0215582 A1* 11/2003 Bermel ............... B29C 41/26
                                                               428/1.31
2009/0258211 A1   10/2009   Yoshinaga et al.
2013/0045390 A1* 2/2013 Xu ..................... C09C 1/3081
                                                        977/773
2017/0275394 A1   9/2017   Mori et al.
2018/0369859 A1* 12/2018 Boswell ............... B05D 7/04

FOREIGN PATENT DOCUMENTS

| JP | S55-3445 A | | 1/1980 | |
|---|---|---|---|---|
| JP | s-553445 A | * | 1/1980 | |
| JP | H09-11606 A | | 1/1997 | |
| JP | H1034844 A | * | 2/1998 | |
| JP | 2006-305924 A | | 11/2006 | |
| JP | 2006307059 A | * | 11/2006 | |
| JP | 2013-147670 A | | 8/2013 | |
| JP | 2017-078166 A | | 4/2017 | |
| KR | 10-2013-0117278 A | | 10/2013 | |
| WO | WO-2014123221 A1 | * | 8/2014 | ............. B32B 27/08 |
| WO | 2016/047126 A1 | | 3/2016 | |

OTHER PUBLICATIONS

Buchwalder et al., Thermal Analysis of Parylene Thin Films for Barrier Layer Applications, Polymers, 2022, 14, 3677 (Year: 2022).*
Extended European Search Report issued in corresponding European Patent Application No. 20793976.0 dated Jan. 19, 2023.
International Search Report issued in related International Patent Application No. PCT/JP2020/017286 dated Jul. 21, 2020.
Office Action issued for the corresponding Chinese Application No. 202080030962.5, dated Apr. 29, 2024.

\* cited by examiner

*Primary Examiner* — Michael C Romanowski
(74) *Attorney, Agent, or Firm* — Morgan, Lewis & Bockius LLP

(57) ABSTRACT

There is provided a water-soluble film containing polyvinyl alcohol resin, wherein the ratio of fluorine element to the total amount of elements (F1S) found at the time of analyzing a first surface of the water-soluble film through X-ray Photoelectron Spectroscopy is 1 mol % or greater and 25 mol % or less; and ratio of the fluorine element to the total amount of elements (F1B) found at the time of analyzing a surface 0.1 μm deep from the first surface through X-ray Photoelectron Spectroscopy is 0.5 mol % or less. As a result, a water-soluble film having excellent detachability from the support, as well as excellent transparency and sealing property, and a packaging body for chemicals may be provided using this film.

20 Claims, No Drawings

WATER-SOLUBLE FILM AND PACKAGING

TECHNICAL FIELD

The present invention relates to a water-soluble film containing poly-vinyl alcohol resin suitably used for packaging various chemicals etc., and a packaging body using the film.

BACKGROUND ART

Conventionally, water-soluble films are widely used in applications such as packaging bodies including various chemicals such as detergents and pesticides, and seeds, with increasing demand due to convenience.

Poly-vinyl alcohol resin (may be abbreviated as PVA hereafter) films including poly-vinyl alcohol resin as a main constituent are widely used as such applied water-soluble films Various technologies for improving several physical properties of the PVA film are proposed. For example, a water-soluble film having water solubility improved by adding various additives such as a plasticizer etc. and/or using modified PVA is proposed (Patent Document 1, for example).

The water-soluble film disclosed in Patent Document 1 reduces its degree of crystallinity and increases solubility by adjusting the mounts of additives such as a plasticizer etc. and/or using the modified PVA. However, the water-soluble film uses hydrophilic PVA, which has high interaction with metal materials. As a result, when forming the water-soluble film on a support such as a metal roller or metal belt, etc., detachability of the film from the support is so poor that surface roughness, thickness unevenness, etc. may be generated easily. Conventionally, detachability is controlled using a method of including a surfactant in the water-soluble film.

However, hand in hand with recent increase in demand for water-soluble films, improvement in productivity is desired. While productivity may be improved by increasing the film forming speed, the faster the film forming speed, the more insufficient detachability with the conventional technology, causing generation of surface roughness, thickness unevenness, etc. and decrease in yield.

On the other hand, even PVA films for optical applications different from the applications of the present invention have the same problem of poor detachability from the support at the time of film formation, and therefore an alternative method of adding a fluorine-containing surfactant to the film forming solution for the PVA film is proposed (Patent Document 2). In addition, regarding the same optical application-specific PVA film, a method of coating a cast base with fluorine-containing resin is proposed, so as to form a rigid fluorine-based resin film, resulting in improvement of detachability (Patent Document 3).

PRIOR ART DOCUMENTS

Patent Documents

Patent Document 1: JP 2017-078166A
Patent Document 2: JP 2006-307059A
Patent Document 3: JP 2006-305924A However, with the technology of Patent Document 2, use of a large amount of the fluorine-containing surfactant is necessary, and attacking environmental pollution from halogen substances, which has been a problem recently, is difficult. Moreover, hydrophobic halogen substances have poor affinity with PVA, and thus phase separation in the film occurs, easily losing transparency of the film. Furthermore, in the case of applying this technology to the water-soluble film, if the film contains a large amount of the fluorine-containing surfactant, seal failure often occurs, possibly leading to leakage of the encapsulated substance from the sealing part when sealing films together (may be referred to as 'sealing' hereafter) using water and/or heat carried out after packaging an encapsulated substance.

On the other hand, when applying the technology of Patent Document 3 to the water-soluble film, compared to an optical film, the water-soluble film easily adheres to other films due to moisture absorption, and generation of creases or breakage etc. due to friction with a roller may occur at the time of roll unwinding and the like. Moreover, formation of a rigid fluorine-based resin film on a support such as a roller or belt may be costly from the perspective of materials as well as maintenance of the support.

DISCLOSURE OF THE INVENTION

Problems to be Solved by the Invention

The present invention aims to provide a water-soluble film, which has excellent detachability from the support at the time of forming the water-soluble film, as well as transparency and seal efficiency, and a packaging body for chemicals using said film. Moreover, the present invention provides a method for forming a water-soluble film having these excellent characteristics.

Means of Solving the Problems

As a result of intensive studies made by the present inventors, it has been found that the problems given above are resolved when the ratio of fluorine element to the total amount of elements of a first surface of the water-soluble film is within a specified range, and the rate of the fluorine element to the total amount of elements in a place slightly on the central side from the first surface along the thickness of the film is a certain value or less, and through further study based on these findings, the present invention has been completed.

Namely, the present invention relates to the following items.

[1] A water-soluble film containing polyvinyl alcohol resin, wherein the ratio of fluorine element to the total amount of elements (F1S) found at the time of analyzing a first surface of the water-soluble film through X-ray Photoelectron Spectroscopy is 1 mol % or greater and 25 mol % or less; and ratio of the fluorine element to the total amount of elements (F1B) found at the time of analyzing a surface 0.1 μm deep from the first surface through X-ray Photoelectron Spectroscopy is 0.5 mol % or less.

[2] The water-soluble film according to Item [1], wherein the ratio of fluorine element to the total amount of elements (F2S) found at the time of analyzing a second surface facing the first surface of the water-soluble film through X-ray Photoelectron Spectroscopy is 1 mol % or greater and 25 mol % or less; and ratio of fluorine element to the total amount of elements (F2B) found at the time of analyzing a surface 0.1 μm deep from the second surface through X-ray Photoelectron Spectroscopy is 0.5 mol % or less.

[3] The water-soluble film according to either Item [1] or Item [2], wherein difference between the F1S and the F2S is 2.5 mol % or greater.

[4] The water-soluble film according to any one of Item [1] to Item [3], wherein the fluorine element is contained in a fluorine-containing surfactant having a molecular weight of 10,000 or less.

[5] The water-soluble film according to Item [4], wherein the fluorine-containing surfactant is at least one type selected from a group consisting of fluoroalkyl alcohol, fluoroalkyl carboxylate, fluoroalkyl sulfate ester, fluoroalkyl sulfonate, fluoroalkyl phosphoric ester salt, fluoroalkyl phosphonate, fluoroalkyl phosphonous salt, and fluoroalkyl ammonium salt.

[6] The water-soluble film according to Item [5], wherein the fluorine-containing surfactant is at least one type selected from a group consisting of fluoroalkyl alcohol, fluoroalkyl phosphoric ester salt, and fluoroalkyl sulfonate.

[7] A packaging body in which the water-soluble film according to any one of Item [1] to Item [6] stores a chemical.

[8] The packaging body according to Item [7], wherein the chemical is a pesticide, a detergent, or a disinfectant.

[9] The packaging body according to either Item [7] or Item [8], wherein the chemical is in a liquid state.

[10] A formation method for the water-soluble film according to any one of Item [4] to Item [6] includes the step of coating a support with the fluorine-containing surfactant, and flow-casting a film forming solution containing polyvinyl alcohol resin in film form on the resulting coated surface.

[11] The formation method for the water-soluble film according to Item [10], wherein the support is coated with the fluorine-containing surfactant by continuously coating the support with a solution of the fluorine-containing surfactant or an aqueous dispersion of the same, and drying the resulting coated support.

Results of the Invention

According to the present invention, a water-soluble film, which has excellent detachability from a support at the time of film formation, as well as transparency, and seal efficiency, and a packaging body for chemicals using said film may be provided. Moreover, according to the present invention, formation of a water-soluble film having these excellent characteristics is possible.

Furthermore, the water-soluble film according to the present invention is excellent in preventing films from adhering to each other due to moisture absorption while maintaining the characteristics given above.

DESCRIPTION OF EMBODIMENTS

The present invention is described in detail below.

According to the present invention, it is important that the ratio of the fluorine element to the total amount of elements (F1S) found at the time of analyzing a first surface of a water-soluble film through X-ray Photoelectron Spectroscopy (may be referred to as XPS hereafter) is 1 mol % or greater and 25 mol % or less. When F1S is less than 1 mol %, detachability from the base material at the time of film formation is insufficient. F1S is preferably 1.5 mol % or greater, more preferably 2 mol % or greater, even more preferably 2.5 mol % or greater, and most preferably 3 mol % or greater. On the other hand, when F1S exceeds 25 mol %, seal failure occurs easily when sealing the packaging body. F1S is preferably 23 mol % or less, more preferably 21 mol % or less, even more preferably 20 mol % or less, and most preferably 19 mol % or less.

Further according to the present invention, it is important that the ratio of the fluorine element to the total amount of elements (F1B) found at the time of analyzing a surface 0.1 μm deep from the first surface of the water-soluble film through XPS is 0.5 mol % or less. Even when F1B exceeds 0.5 mol %, seal failure occurs easily when sealing the packaging body. F1B is preferably 0.4 mol % or less, more preferably 0.3 mol % or less, and even more preferably 0.2 mol % or less. F1B may be 0 mol %, that is, less than the detection limit of an XPS measurement device. The detection limit of a typical XPS measurement device is normally around 0.1 mol %.

According to the present invention, amounts of the fluorine element and the other elements in the surface of the water-soluble film are measured through XPS. XPS measurement consists of exciting atom core electrons by irradiating a specimen surface with X-rays, and detecting the kinetic energy of resulting emitted photo-electrons, thereby identifying and quantifying the elements present on the specimen surface, and analyzing the chemical bonding state.

According to the present invention, the elements measured through XPS are carbon (1s orbital electron), nitrogen (1s orbital electron), oxygen (1s orbital electron), fluorine (1s orbital electron), natrium (1s orbital electron), silicon (2p orbital electron), phosphorus (2p orbital electron), and sulfur (2p orbital electron). The amounts of the elements are quantified, and the ratio of the fluorine element to the total amount of those elements is set as F1S.

Moreover, XPS measurement allows analysis along the depth of the film after having etched the film surface using C60 (Buckminsterfullerene), argon clusters or the like. According to the present invention, a surface approximately 0.1 μm deep from the film surface is exposed by etching for 100 seconds using C60 under the conditions of an acceleration voltage of 10 kV, a sample current of 20 nA, and a scanning field of 0.5×2.0 mm, and thereby quantifying the amount of F1B.

Note that according to the present invention, when carrying out XPS measurement on both surfaces of the water-soluble film so as to find the ratio of the fluorine element to the total amount of the elements found in the respective surfaces, the surface with a higher ratio of the fluorine element is set as the first surface.

According to the present invention, it is preferable that the ratio of the fluorine element to the total amount of elements (F2S) found at the time of analyzing a second surface facing the first surface of the water-soluble film through XPS is 1 mol % or greater. When F2S is less than 1 mol %, there is a tendency that films easily adhere to each other. F2S is more preferably 1.5 mol % or greater, even more preferably 2 mol % or greater, and most preferably 2.5 mol % or greater. Meanwhile, when F2S exceeds 25 mol %, there is a tendency that seal failure occurs easily when sealing the packaging body. F2S is more preferably 23 mol % or less, even more preferably 21 mol % or less, and most preferably 19 mol % or less.

Further according to the present invention, it is preferable that the ratio of the fluorine element to the total amount of the elements (F2B) found at the time of analyzing a surface 0.1 μm deep from the second surface of the water-soluble film through XPS is 0.5 mol % or less. There is a tendency that even when F2B exceeds 0.5 mol %, seal failure occurs easily when sealing the packaging body. F2B is more preferably 0.4 mol % or less, even more preferably 0.3 mol % or less, and most preferably 0.2 mol % or less. F2B may be 0 mol %, that is, less than the detection limit of an XPS measurement device. The detection limit of a typical XPS measurement device is normally as described above.

Yet even further according to the present invention, the difference between F1S and F2S is preferably 2.5 mol % or greater. The difference between F1S and F2S being 2.5 mol % or greater makes it difficult for seal failure to occur. The difference between F1S and F2S is more preferably 3 mol % or greater, and even more preferably 4 mol % or greater. The difference between F1S and F2S, according to the present invention, does not exceed 25 mol %.

<Polyvinyl Alcohol Resin>

The water-soluble film of the present invention contains polyvinyl alcohol resin (PVA). It is possible to use PVA formed by saponifying a vinyl ester copolymer, which is obtained by polymerizing a vinyl ester monomer. For example, vinyl formate, vinyl acetate, vinyl propionate, vinyl valerate, vinyl laurate, vinyl stearate, vinyl benzoate, vinyl pivalate, and vinyl versatate are available as the vinyl ester monomer, wherein vinyl acetate is most preferable.

The vinyl ester copolymer described above is obtained preferably using one or two or more kinds of only the vinyl ester monomers as monomers, and obtained more preferably using only one kind of the vinyl ester monomers as the monomer; however, a copolymer made from one or two or more kinds of the vinyl ester monomers and another monomer that can be copolymerized may be used.

The other monomer that can be copolymerized with the vinyl ester monomer may be ethylene; an olefin having 3 to 30 carbon atoms, such as propylene, 1-butene, or isobutene; acrylic acid or a salt thereof; an acrylic ester, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid or a salt thereof; a methacrylic ester, such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, or octadecyl methacrylate; an acrylamide derivative, such as acrylamide, N-methylacrylamide, N-ethylacrylamide, N,N-dimethylacrylamide, diacetone acrylamide, acrylamide propyl dimethylamine or a salt thereof, acrylamide propyldimethylamin or a salt thereof, or N-methylolacrylamide or a derivative thereof; a methacrylamide derivative, such as methacrylamide, N-methylmethacrylamide, N-ethylmethacrylamide, methacrylamide propyldimethylamin or a salt thereof, or N-methylolmethacrylamide or a derivative thereof; an N-vinylamide, such as N-vinylformamide, N-vinylacetamide, or N-vinylpyrrolidone; a vinyl ether, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; a vinyl cyanide such as acrylonitrile or methacrylonitrile; a vinyl halide such as vinyl chloride, vinylidene chloride, vinyl fluoride, or vinylidene fluoride; an allyl compound, such as allyl acetate or allyl chloride; maleic acid or a salt thereof, an ester or an acid anhydride thereof; itaconic acid or a salt thereof, an ester or an acid anhydride thereof; a vinylsilyl compound, such as vinyltrimethoxysilane; or isopropenyl acetate.

The vinyl ester copolymer described above may have structural units derived from one or more types of these other monomers.

The ratio of the structural units derived from the other monomers given above to the vinyl ester copolymer described above, from the perspective of water solubility and film strength, is preferably 15 mol % or less, more preferably 5 mol % or less based on the mol numbers of all of the structural units configuring the vinyl ester copolymer.

While the polymerization degree of PVA is not particularly limited, the lower limit of the polymerization degree is preferably 200 or greater, more preferably 300 or greater, even more preferably 500 or greater from the perspective of film strength. On the other hand, the upper limit of the polymerization degree is preferably 8,000 or less, more preferably 5,000 or less, even more preferably 3,000 or less from the perspective of productivity of PVA and of the water-soluble film Here, polymerization degree means the average polymerization degree measured in accordance with JIS K 6726-1994. That is, in this Specification, once a residual acetate group of PVA is saponified and purified, the limiting viscosity [η] (unit: deciliter/g) is measured in water at 30° C. so as to find the polymerization degree using the following equation.

$$Po=([\eta]\times 10^4/8.29)^{(1/0.62)}$$

According to the present invention, saponification degree of PVA is preferably 64 to 99.99 mol %. Adjusting the saponification degree within this range enhances the compatibility of water solubility of the film with mechanical properties of the same. The lower limit of the saponification degree is more preferably 70 mol % or greater, and even more preferably 75 mol % or greater. On the other hand, the upper limit of the saponification degree is more preferably 99.96 mol % or less, even more preferably 99.93 mol % or less. This saponification degree of PVA is the ratio (mol %) of the number of mols of a vinyl alcohol unit to total number of mols of the vinyl alcohol unit and a structural unit (typically a vinyl ester monomer unit) of the PVA that can be converted to the vinyl alcohol unit through saponification. The saponification degree of PVA may be measured in accordance with JIS K 6726-1994.

One type of PVA alone may be used for the water-soluble film according to the present invention, or otherwise a blend of two or more types of PVA that differ in polymerization degree, saponification degree, and/or modification degree may be used.

While the content percentage of PVA in the water-soluble film according to the present invention is not particularly limited, it is preferably 50 mass %, more preferably 80 mass %, even more preferably 85 mass %.

<Plasticizer>

A PVA film is more rigid than other plastic films in a state not including a plasticizer, where mechanical properties such as impact strength etc. and passability through processing steps at the time of secondary processing etc. may be problems. The water-soluble film of the present invention preferably contains a plasticizer to prevent these problems. Polyhydric alcohol is preferable as the plasticizer. More specifically, ethylene glycol, glycerine, diglycerine, propylene glycol, diethylene glycol, triethylene glycol, tetraethylene glycol, trimethylolpropane, and sorbitol etc. may be given as examples of polyhydric alcohol. These plasticizers may be used alone, or in combination of two types or more. Of these plasticizers, ethylene glycol and glycerine are preferable, and glycerine is more preferable from the perspective of difficulty of bleeding out to the film surface, etc.

Content of the plasticizer in the water-soluble film is preferably 1 part mass or greater, more preferably 3 parts mass or greater, even more preferably 5 parts mass or greater to 100 parts mass PVA contained in the water-soluble film. Moreover, it is preferably 70 parts mass or less, more preferably 50 parts mass or less, and even more preferably 40 parts mass or less. When the above content is less than 1 part mass, there is a fear that improved results of mechanical properties such as impact strength etc. are insufficient. On the other hand, when the above content exceeds 70 parts mass, various problems, such as the film becoming too soft, thereby reducing handleability, or bleeding out to the film surface, may occur.

<Starch/Water-Soluble Polymer>

The film according to the present invention may contain a water-soluble polymer other than starch and/or PVA for the purpose of adding mechanical strength to the water-soluble film so as to maintain moisture resistance when handling the film, and/or adjusting the speed of softening due to absorption of water when dissolving the film.

Examples of starch are natural starches, such as cornstarch, potato starch, sweet potato starch, wheat starch, rice starch, tapioca starch, and sago starch; and processed starches treated with etherification, esterification, oxidation etc., wherein the processed starches are particularly preferred.

Content of starch in the water-soluble film is preferably 15 parts mass or less, more preferably 10 parts mass or less to 100 parts mass PVA. When the content is greater than 15 parts mass, there is a fear that handleability will deteriorate.

The water-soluble polymer other than PVA may be dextrin, gelatin, glue, casein, shellac, gum arabic, polyacrylate amide, sodium polyacrylate, polyvinyl methyl ether, a copolymer of methyl vinyl ether and maleic anhydride, a copolymer of vinyl acetate and itaconic acid, polyvinyl pyrrolidone, cellulose, cellulose acetate, acetylbutyl cellulose, carboxymethyl cellulose, methyl cellulose, ethyl cellulose, hydroxyethyl cellulose, and sodium alginate, for example.

Content of the water-soluble polymer other than PVA in the water-soluble film is preferably 15 parts mass or less, more preferably 10 parts mass or less to 100 parts mass PVA. When the content is greater than 15 parts mass, there is a fear that the water solubility of the film is insufficient.

<Surfactant>

The water-soluble film according to the present invention preferably contains a surfactant from the perspective of handleability and control of film surface abnormalities (die lines, surface roughness, etc.) of the water-soluble film. While the type of surfactant is not particularly limited, it may be an anionic surfactant or a nonionic surfactant, for example.

The anionic surfactant may be a carboxylic acid type, such as potassium laurate; a sulfuric ester type, such as octyl sulfate; or a sulfonic acid type, such as dodecylbenzene sulfonate, for example.

The nonionic surfactant may be an alkyl ether type, such as polyoxyethylene lauryl ether or polyoxyethylene oleyl ether; an alkylphenyl ether type, such as polyoxyethylene octylphenyl ether; an alkyl ester type, such as polyoxyethylene laurate; an alkylamine type, such as polyoxyethylene lauryl aminoether; an alkylamide type, such as polyoxyethylene laurate amide; a polypropylene glycol ether type, such as polyoxyethylene-polyoxypropylene ether; an alkanolamide type, such as diethanolamide laurate or diethanolamide oleate; or an allyphenyl ether type, such as polyoxyalkylene allyphenyl ether.

These surfactants may be used alone, or in combination of two types or more. Of these surfactants, the nonionic surfactants are preferable from the perspective of excellent reduction effect of film surface abnormalities at the time of film formation. More specifically, an alkanolamide type surfactant is more preferable, dialkanolamide (e.g., diethanolamide etc.) of aliphatic carboxylic acid (e.g., saturated or unsaturated aliphatic carboxylic acid having 8 to 30 carbon atoms) is even more preferable.

Surfactant content in the water-soluble film is preferably 0.01 parts mass or greater, more preferably 0.02 parts mass or greater, even more preferably 0.05 parts mass or greater to 100 parts mass PVA. The upper limit of surfactant content is preferably 5 parts mass or less, more preferably 1 part mass or less, even more preferably 0.5 parts mass or less, and most preferably 0.3 parts mass or less. When the above content is less than 0.02 parts mass, problems that detachability from a film formation device is poor when forming the water-soluble film, and/or that blocking between films occurs etc. arise more easily. On the other hand, when the above content is greater than 5 parts mass, problems such as bleeding out to the film surface and/or deterioration of film appearance due to coagulation of the surfactant occur easily.

<Other Components>

The water-soluble film according to the present invention may contain, within a range not inhibiting the results of the present invention, components such as plasticizer, starch, water-soluble polymers other than PVA, and surfactants, and may also contain moisture, oxidation inhibitor, ultraviolet light absorber, lubricant, crosslinking agent, colorant, filler, preservative, anti-mold agent, and other polymer compounds, etc. The ratio of the total mass of PVA, plasticizer, starch, water-soluble polymers other than PVA, and surfactant to mass of the water-soluble film of the present invention is preferably within a range of 60 to 100 mass %, more preferably within a range of 80 to 100 mass %, and even more preferably within a range of 90 to 100 mass %.

PVA and the above respective components are mixed uniformly with a solvent, and then prepared as a film forming solution for forming a water-soluble film. The solvent to be used may be arbitrarily chosen as long as it is any one of water, alcohol, dimethyl sulfoxide, etc., which are good solvents for PVA. Of these, water is preferred from the perspective of cost, environmental burden, solvent collection being unnecessary, etc. The solvent may be used alone, or in combination of two types or more.

While the method of preparing the film forming solution is not particularly limited according to the present invention, an arbitrary method, such as method of dissolving PVA and an additive, such as a plasticizer or a surfactant, in a solution tank, or method of melting and mixing a plasticizer, a surfactant, or the like when melting and mixing PVA that has retained water using a single or twin-screw extruder, may be adopted.

The volatile component rate (concentration of volatile components in a solvent etc. that are removed through volatilization or evaporation during film formation) of the film forming solution is preferably within a range of 50 to 90 mass %, more preferably within a range of 55 to 80 mass %. When the volatile component rate is less than 50 mass %, there are cases where viscosity of the film forming solution is high, making it difficult to form a film. On the other hand, when the volatile component rate exceeds 90 mass %, viscosity decreases, and uniform thickness of the resulting film is thus easily lost.

The volatile component rate of the film forming solution is found using the following equation.

$$\text{Volatile component rate (mass \%) of film forming solution} = \{(Wa-Wb)/Wa\} \times 100$$

(where in the equation, Wa denotes mass (g) of the film forming solution, and Wb denotes mass (g) when the film forming solution of Wa (g) is dried for 16 hours in an electric dryer of 105° C.)

<Formation Method of Water-Soluble Film>

According to the present invention, examples of the formation method of the water-soluble film using the above film forming solution are a flow-casting film forming method, a wet film forming method (discharge into a poor solvent), a dry film forming method, a gel film forming method (method of temporarily cooling and gelling the film forming solution, and then extracting and removing the solvent so as to obtain a PVA film), a method of forming a film by a combination of these methods, a melt extrusion film forming method of obtaining the film forming solution using an extruder or the like and extruding it from a T-die etc., thereby forming a film, and an inflation film forming method. Of these methods, the flow-casting film forming method and the melt extrusion film forming method allow formation of a homogeneous film with good productivity, and are thus preferred. Since the water-soluble film of the present invention has excellent detachability from a metal roller or metal drum, the film forming method of coating a support of the metal roller or metal drum with a PVA solution, and drying and detaching it is preferred from the perspective of productivity. The flow-casting film forming method and the melt extrusion film forming method for the water-soluble film are described below.

In the case of forming a water-soluble film using the flow-casting film forming method or the melt extrusion film forming method, the film forming solution described above is flow-cast in film form onto a support of a metal roller or metal belt, and heated so as to remove the solution, thereby solidifying it into a film. The solidified film is detached from the support, dried using a drying roller or drying furnace as needed, and further heat treated as needed, and then wound, thereby obtaining a long roll-shaped, water-soluble film.

Exemplary methods of adjusting the ratio of the fluorine element (F1S and F2S) of the water-soluble film surface to 1 mol % or greater and 25 mol % or less, according to the present invention, are: (1) method of coating the support with a fluorine-containing compound, and flow-casting in film form the film forming solution containing PVA on the coated surface; (2) method of coating with a fluorine-containing compound a PVA film formed by flow-casting in film form the film forming solution containing PVA on the support; and (3) method of adding a fluorine-containing compound to the film forming solution containing PVA, and flow-casting the film forming solution in film form. Of these methods, method (1) is particularly preferred from the perspective of forming cost and uniformity of fluorine on the film surface, etc. This method is described below.

The fluorine-containing compound, according to the present invention, is preferably a fluorine-containing surfactant having a molecular weight of 10000 or less due to ease of transferring to the water-soluble film surface. The molecular weight of the fluorine-containing surfactant is more preferably within a range of 150 to 9000, even more preferably within a range of 300 to 8000, even more preferably within a range of 400 to 7000, most preferably within a range of 500 to 6000.

A fluorine-containing surfactant in a solid state or a highly viscous liquid state is dissolved or dispersed in an appropriate solvent such as water or alcohol, and then used. A fluorine-containing surfactant in a low viscous liquid state may be used as is. The method of coating the support with the fluorine-containing surfactant may be an arbitrary method, such as (1) method of making a solution or aqueous dispersion of a fluorine-containing surfactant in a low viscous liquid state or a fluorine-containing surfactant in a highly viscous liquid state have direct physical contact with the support, and making the coated amount uniform using a doctor knife etc., or (2) method of applying the aqueous dispersion etc. uniformly using a roll coater, etc. At this time, the coated surface may be dried as needed by heating the support or blowing hot air thereon. Of these methods, continuously coating the support with the fluorine-containing surfactant or the aqueous dispersion and drying it is preferred from the perspective of coating the support with the fluorine-containing surfactant uniformly. More specifically, it is preferable that once the PVA film is detached from the support, the support is continuously coated with the fluorine-containing surfactant and dried while the film forming solution is flow-casted on the support.

<Fluorine-Containing Surfactant>

The fluorine-containing surfactant according to the present invention is exemplified by the following:

fluoroalkyl alcohol represented by the general chemical formula RfOH, fluoroalkyl carboxylate represented by the general chemical formula RfCOOM, fluoroalkyl sulfate ester represented by the general chemical formula $Rf_xOSO_{(3-x)}M$, fluoroalkyl sulfonate represented by the general chemical formula $RfSO_3M$, fluoroalkyl phosphoric ester salt represented by the general chemical formula $Rf_xOPO_{(3-x)}M$, fluoroalkyl phosphonate represented by the general chemical formula $RfPO_3M$, fluoroalkyl phosphonous salt represented by the general chemical formula $RfPO_2M$, and fluoroalkyl ammonium salt represented by the general chemical formula $Rf_xNH_{(4-x)}M$.

In these general chemical formulas, Rf represents an alkyl group having 1 to 50 carbon atoms including a fluorine atom. Rf may include an ether bond in the alkyl group. M represents at least one or more of a counter cation or counter anion. In addition, x is 1 to 3 or 4.

Of these fluorine-containing surfactants, fluoroalkyl alcohol is a neutral surfactant, fluoroalkyl carboxylate, fluoroalkyl sulfate ester, fluoroalkyl sulfonate, fluoroalkyl phosphoric ester salt, fluoroalkyl phosphonate, and fluoroalkyl phosphonous salt are anionic surfactants, and fluoroalkyl ammonium salt is a cationic surfactant.

Moreover, while the counter cation is not particularly limited, it may be $Na^+$, $Ca^{2+}$, $NH_4^+$, or a mixture thereof. The counter anion is also not particularly limited, and may be $Cl^-$ or the like.

Specific examples of the fluoroalkyl alcohol are a partially fluorinated alkyl alcohol, such as monofluoromethylethyl alcohol, trifluoromethylethyl alcohol, trifluoromethylpropyl alcohol, trifluoromethylbutyl alcohol, or partially fluorinated higher alcohol; a perfluoroalkyl alcohol, such as trifluoromethyl alcohol, pentafluoroethyl alcohol, heptafluoropropyl alcohol, pentadecafluoroheptyl alcohol, heptadecafluorooctyl alcohol, or nonadecafluorononyl alcohol; and a fluoroalkyl alcohol containing an ether bond represented by the general chemical formula $Rf(ORf)_nOH$, such as trifluoromethyloxyethyl alcohol, trifluoromethyloxypropyl alcohol, trifluoromethyl(polyoxyethylene) alcohol, pentafluoroethyl (polyoxyethylene) alcohol, trifluoromethyl(polyoxyperfluoroethylene) alcohol, or pentafluoroethyl(polyoxyperfluoroethylene) alcohol, wherein Rf represents an alkyl group including a fluorine atom, and n represents degree of condensation.

Specific examples of the fluoroalkyl carboxylate are a partially fluorinated alkyl carboxylate, such as monofluoromethylethyl carboxylate, trifluoromethylethyl carboxylate, trifluoromethylpropyl carboxylate, trifluoromethylbutyl carboxylate, or partially fluorinated higher fatty acid salt; a perfluoroalkyl carboxylate, such as trifluoromethyl carboxylate, pentafluoroethyl carboxylate, heptafluoropropyl carboxylate, pentadecafluoroheptyl carboxylate, heptadecafluorooctyl carboxylate, or nonadecafluorononyl carboxylate; and a fluoroalkyl carboxylate containing an ether bond represented by the general formula $Rf(ORf)_nCOOM$, such as trifluoromethyloxyethyl carboxylate, trifluoromethyloxypropyl carboxylate, trifluoromethyl(polyoxyethylene) carboxylate, pentafluoroethyl (polyoxyethylene) carboxylate, trifluoromethyl (polyoxyperfluoroethylene) carboxylate, or pentafluoroethyl (polyoxyperfluoroethylene) carboxylate.

Specific examples of the fluoroalkyl sulfate ester are a partially fluorinated alkyl sulfate ester, such as monofluoromethylethyl sulfate ester, trifluoromethylethyl sulfate ester, trifluoromethylpropyl sulfate ester, trifluoromethylbutyl sulfate ester, or partially fluorinated higher alkyl sulfate ester; a perfluoroalkyl sulfate ester, such as trifluoromethyl sulfate ester, pentafluoroethyl sulfate ester, heptafluoropropyl sulfate ester, pentadecafluoroheptyl sulfate ester, heptadecafluorooctyl sulfate ester, or nonadecafluorononyl sulfate ester; and a fluoroalkyl carboxylate containing an ether bond represented by the general formula $Rf(ORf)_nOSO_3M$, such as trifluoromethyloxyethyl sulfate ester, trifluoromethyloxypropyl sulfate ester, trifluoromethyl (polyoxyethylene) sulfate ester, pentafluoroethyl(polyoxyethylene) sulfate ester, trifluoromethyl(polyoxyperfluoroethylene) sulfate ester, or pentafluoroethyl (polyoxyperfluoroethylene) sulfate ester.

Specific examples of the fluoroalkyl sulfonate are a partially fluorinated alkyl sulfonate, such as monofluoromethylethyl sulfonate, trifluoromethylethyl sulfonate, trifluoromethylpropyl sulfonate, trifluoromethylbutyl sulfonate, or partially fluorinated higher alkyl sulfonate; a perfluoroalkyl sulfonate, such as trifluoromethyl sulfonate, pentafluoroethyl sulfonate, heptafluoropropyl sulfonate, pentadecafluoroheptyl sulfonate, heptadecafluorooctyl sulfonate, or nonadecafluorononyl sulfonate; and a fluoroalkyl sulfonate containing an ether bond represented by the general formula $Rf(ORf)_nSO_3M$, such as trifluoromethyloxyethyl sulfonate, trifluoromethyloxypropyl sulfonate, trifluoromethyl(polyoxyethylene) sulfonate, pentafluoroethyl(polyoxyethylene) sulfonate, trifluoromethyl(polyoxyperfluoroethylene) sulfonate, or pentafluoroethyl(polyoxyperfluoroethylene) sulfonate. Moreover, it may be fluoroalkyl greater than diester.

Specific examples of the fluoroalkyl phosphoric ester salt are a partially fluorinated alkyl phosphoric ester salt, such as monofluoromethylethyl phosphoric ester salt, trifluoromethylethyl phosphoric ester salt, trifluoromethylpropyl phosphoric ester salt, trifluoromethylbutyl phosphoric ester salt, or partially fluorinated higher alkyl phosphoric ester salt; a perfluoroalkyl phosphoric ester salt, such as trifluoromethyl phosphoric ester salt, pentafluoroethyl phosphoric ester salt, heptafluoropropyl phosphoric ester salt, pentadecafluoroheptyl phosphoric ester salt, heptadecafluorooctyl phosphoric ester salt, or nonadecafluorononyl phosphoric ester salt; and a fluoroalkyl phosphoric ester salt containing an ether bond represented by the general formula $Rf(ORf)_nOPO_3M$, such as trifluoromethyloxyethyl phosphoric ester salt, trifluoromethyloxypropyl phosphoric ester salt, trifluoromethyl(polyoxyethylene) phosphoric ester salt, pentafluoroethyl(polyoxyethylene) phosphoric ester salt, trifluoromethyl(polyoxyperfluoroethylene) phosphoric ester salt, or pentafluoroethyl(polyoxyperfluoroethylene) phosphoric ester salt. Moreover, it may be fluoroalkyl greater than diester.

Specific examples of the fluoroalkyl phosphonate are a partially fluorinated alkyl phosphonate, such as monofluoromethylethyl phosphonate, trifluoromethylethyl phosphonate, trifluoromethylpropyl phosphonate, trifluoromethylbutyl phosphonate, or partially fluorinated higher alkyl phosphonate; a perfluoroalkyl phosphonate, such as trifluoromethyl phosphonate, pentafluoroethyl phosphonate, heptafluoropropyl phosphonate, pentadecafluoroheptyl phosphonate, heptadecafluorooctyl phosphonate, or nonadecafluorononyl phosphonate; and a fluoroalkyl phosphonate containing an ether bond represented by the general formula $Rf(ORf)_nPO_3M$, such as trifluoromethyloxyethyl phosphonate, trifluoromethyloxypropyl phosphonate, trifluoromethyl(polyoxyethylene) phosphonate, pentafluoroethyl(polyoxyethylene) phosphonate, trifluoromethyl(polyoxyperfluoroethylene) phosphonate, or pentafluoroethyl (polyoxyperfluoroethylene) phosphonate.

Specific examples of the fluoroalkyl phosphonous salt are a partially fluorinated alkyl phosphonous salt, such as monofluoromethylethyl phosphonous salt, trifluoromethylethyl phosphonous salt, trifluoromethylpropyl phosphonous salt, trifluoromethylbutyl phosphonous salt, or partially fluorinated higher alkyl phosphonous salt; a perfluoroalkyl phosphonous salt such as trifluoromethyl phosphonous salt, pentafluoroethyl phosphonous salt, heptafluoropropyl phosphonous salt, pentadecafluoroheptyl phosphonous salt, heptadecafluorooctyl phosphonous salt, or nonadecafluorononyl phosphonous salt; and a fluoroalkyl phosphonous salt containing an ether bond represented by the general formula $Rf(ORf)_nPO_2M$, such as trifluoromethyloxyethyl phosphonous salt, trifluoromethyloxypropyl phosphonous salt, trifluoromethyl(polyoxyethylene) phosphonous salt, pentafluoroethyl(polyoxyethylene) phosphonous salt, trifluoromethyl(polyoxyperfluoroethylene) phosphonous salt, or pentafluoroethyl(polyoxyperfluoroethylene) phosphonous salt.

Specific examples of the fluoroalkyl ammonium salt are a partially fluorinated alkyl ammonium salt, such as monofluoromethylethyl ammonium salt, trifluoromethylethyl ammonium salt, trifluoromethylpropyl ammonium salt, trifluoromethylbutyl ammonium salt, or partially fluorinated higher alkyl ammonium salt; a perfluoroalkyl ammonium salt, such as trifluoromethyl ammonium salt, pentafluoroethyl ammonium salt, heptafluoropropyl ammonium salt, pentadecafluoroheptyl ammonium salt, heptadecafluorooctyl ammonium salt, or nonadecafluorononyl ammonium salt; and a fluoroalkyl ammonium salt containing an ether bond represented by the general formula $(Rf(ORf)_n)_xNH_{(4-x)}M$, such as trifluoromethyloxyethyl ammonium salt, trifluoromethyloxypropyl ammonium salt, trifluoromethyl(polyoxyethylene) ammonium salt, pentafluoroethyl(polyoxyethylene) ammonium salt, trifluoromethyl (polyoxyperfluoroethylene) ammonium salt, or pentafluoroethyl(polyoxyperfluoroethylene) ammonium salt.

According to the present invention, selecting a fluorine-containing surfactant having suitable affinity with PVA is a method for adjusting F1S and F1B within respective specified ranges. That is, when a fluorine-containing surfactant having excessive affinity with PVA is selected, there is a fear that the surfactant diffuses easily inside the water-soluble film, making it difficult to achieve improved results of detachability. On the other hand, when a fluorine-containing surfactant having poor affinity with PVA is selected, the amount of the surfactant to be transferred to the water-soluble film surface is reduced, making it easier for adhesion to occur due to moisture absorption. From this perspective, of the above surfactants, use of any one of fluoroalkyl alcohol, fluoroalkyl phosphoric ester salt and fluoroalkyl sulfonate is preferred. These surfactants may be used alone or in combination of multiple types. Moreover, a combination with other surfactants within a range not inhibiting the results of the present invention may be used.

Crystallization of the PVA film flow-casted on the support progresses while the film is on the support and heated and dried during the subsequent drying step. Since mobility of the PVA molecular chain increases by being heated in an area with a very high moisture rate, crystallization progresses and degree of crystallization increases. Accordingly, if the drying speed is too fast, there is a fear that crystals do not grow sufficiently, making the degree of crystallization insufficient. On the other hand, if the drying speed is too slow, there is a tendency that crystal growth progresses, making the crystal size larger. Moreover, if too much heat is applied, there is a fear that the degree of crystallization increases, making water solubility insufficient.

The surface temperature of the support on which the film forming solution is flow-cast is preferably 50 to 110° C. When the surface temperature is less than 50° C., there is a tendency that drying progresses slowly, water solubility deteriorates, and time required for drying becomes longer, thereby reducing productivity. Moreover, if a long period of time is required for drying, there is a tendency that the fluorine-containing surfactant permeates into the film, reducing detachability. When exceeding 110° C., abnormalities of the film surface, such as foaming, tend to occur easily, and due to quickly drying, amorphous components tend to increase, making it easier for blocking to occur due to moisture absorption. From the perspective of making adjustment of the degree of permeation of the fluorine-containing surfactant easier, the above surface temperature is preferably 60 to 100° C., more preferably 65 to 95° C.

Simultaneous with heating the PVA film on the support, hot air may be blown uniformly onto the entire area on a noncontact surface side of the PVA film at a speed of 1 to 10 m per second so as to adjust the drying speed. The temperature of the hot air blown on the noncontact surface side is preferably 50 to 150° C., more preferably 70 to 120° C. from the perspective of drying efficiency and drying uniformity.

The water-soluble film is dried on the support until reaching the volatile component rate of 5 to 50 mass %, and then detached. At that time, the fluorine-containing surfactant coating the support is transferred to the surface of the water-soluble film in physical contact with the support (may be referred to as support surface hereafter).

The water-soluble film detached from the support is further dried as needed. The drying method is not particularly limited, and may be a method of making physical contact with a drying furnace or a drying roller. In the case of drying using multiple drying rollers, making either one surface of the film or the other surface thereof have physical contact with the drying rollers alternately allows reduction of difference in physical properties of both film surfaces. Use of 3 or more drying rollers is preferred, 4 or more is further preferred, and 5 to 30 is even further preferred. Temperature of the drying furnace and drying rollers is preferably 40° C. or higher and 110° C. or lower. The upper limit of the temperature of the drying furnace and drying rollers is preferably 100° C. or lower, more preferably 90° C. or less, even more preferably 85° C. or lower. When the temperature of the drying furnace and drying rollers is too high, there is a fear that the degree of crystallization increases, thereby decreasing the water solubility. On the other hand, the lower limit of the temperature of the drying furnace and drying rollers is preferably 45° C. or higher, more preferably 50° C. or higher. When the temperature of the drying furnace and drying rollers is too low, there is a fear that the degree of crystallization decreases, making it easier for blocking to occur due to moisture absorption.

The water-soluble film may be further heat treated as needed. Carrying out heat treatment allows adjustment of strength, water solubility, etc. of the film. Heat treatment temperature is preferably 60° C. or higher and 135° C. or lower. The upper limit of the heat treatment temperature is more preferably 130° C. or less. When the heat treatment temperature is too high, there is a fear that the degree of crystallization increases due to excessively given heat, thereby decreasing the water solubility.

The water-soluble film formed in this manner further undergoes humidity conditioning and has either film end part (ear) cut off etc. as needed, and is then wound in a roll form on a cylindrical core, and wrapped in moisture-proof packaging, resulting in a product.

According to the present invention, exemplary methods of adjusting the ratio of the fluorine element to the total amount of elements of a surface opposite to the support surface (may be referred to as open surface hereafter) are: (1) method of coating the open surface with a fluorine-containing compound after the film is formed; (2) method of coating with a fluorine-containing surfactant the surfaces of drying rollers to which the open surface is in physical contact, in the case of using drying rollers in the film formation step, so as to transfer it to the open surface; and (3) method of transferring excess quantity of a fluorine-containing surfactant to the support surface, and adjusting winding tension when winding the formed film, thereby transferring a part of the fluorine-containing surfactant on the support surface to the open surface.

Of these methods, from the perspective of film formation equipment cost and productivity, the above-described method (3) of transferring excess quantity of a fluorine-containing surfactant to the support surface, and adjusting winding tension when winding the formed film, thereby transferring a part of the fluorine-containing surfactant on the support surface to the open surface is preferred. The winding tension at that time is preferably 30 to 200 N/m. When the winding tension is less than 30 N/m, there is a fear that the amount of the fluorine-containing surfactant transferred onto the open surface of the film is too little. On the other hand, when the winding tension exceeds 200 N/m, there is a fear that the amount of the fluorine-containing surfactant transferred onto the open surface of the film is too much, and film surface abnormalities such as creases in the film etc. occur. The winding tension is more preferably 40 N/m or greater, even more preferably 50 N/m or greater; moreover, it is preferably 160 N/m or less, more preferably 120 N/m or less.

The volatile component rate of the final water-soluble film obtained through the series of steps described above is preferably within a range of 1 to 5 mass %, more preferably within a range of 2 to 4 mass %.

It is preferable that a complete dissolution time of the water-soluble film according to the present invention is under 150 seconds when immersed in 10° C. deionized water. The complete dissolution time being under 150 seconds allows suitable use as a packaging film for chemicals etc. The complete dissolution time is more preferably within 90 seconds, even more preferably within 60 seconds, and most preferably within 45 seconds. On the other hand, the complete dissolution time is not particularly limited; but for a water-soluble film with an overly short, complete dissolution time with which problems such as blocking between films due to moisture absorption in the atmosphere, and/or decrease in film strength tend to easily occur, the complete dissolution time is preferably 5 seconds or more, further preferably 10 seconds or more, even further preferably 15 seconds or more, and most preferably 20 seconds or more.

Thickness of the water-soluble film according to the present invention is not particularly limited; however, since there is a tendency that secondary workability decreases when the thickness is too thick, it is preferably 200 μm or less, more preferably 150 μm or less, even more preferably 100 μm or less, and most preferably 50 μm or less. When the thickness is too thin, there is a fear of a problem with mechanical strength of the water-soluble film, and a thickness of 5 μm or greater is thus preferred, 10 μm or greater is further preferred, 15 μm or greater is even further preferred, and 20 μm or greater is most preferred. Note that the thickness of the water-soluble film may be found by measuring the thicknesses at 10 arbitrary places (for example, 10 arbitrary places on a straight line drawn along the length of the water-soluble film) and taking the average value thereof.

<Applications>

The water-soluble film according to the present invention has excellent balance of water solubility and mechanical strength, and may be suitably used for various water-soluble film applications. Such water-soluble films may be chemical package films, base films for hydraulic pressure transfer, base films for embroidery, release films for artificial marble molding, seed package films, and films for waste storage bags, for example. Of these films, use of the water-soluble film of the present invention as a chemical package film is preferred due to further remarkable results of the present invention.

Types of chemicals in the case of using the water-soluble film of the present invention as a chemical package film may be pesticides, cleansers (including bleach), or disinfectants. While physical properties of the chemicals are not particularly limited, they may be acidic, neutral, or alkaline. Moreover, the chemicals may include boron-containing compounds. The form of the chemicals may be any one of a powder, a solid, or a liquid. The packaging form is not particularly limited; however, unit packages for packaging (preferably sealed packaging) a unit quantity of chemical per package are preferred. Use of the film according to the present invention as a chemical package film so as to package chemicals results in provision of the packaging body of the present invention.

WORKING EXAMPLES

The present invention is described in detail below through working examples; however, the present invention is not limited in anyway by the following working examples. Note that adopted evaluation items and methods thereof in the following working examples and comparative examples are as described below.

(1) X-Ray Photoelectron Spectroscopy (XPS)
(1-1) Analysis of Ratio of the Fluorine Element to the Total Amount of Elements of the Water-Soluble Film Surface A film is cut to a size of 5 mm×5 mm and set on a measurement pedestal using conductive double-sided tape. Both surfaces of the film are measured and the value of the surface with larger fluorine element content is used. Each sample is measured under the following measurement conditions.

Measuring apparatus: Ohi Quantera SXM (ULVAX-PHI. INC.)
Analysis software: Multi Pack ver9.0 (ULVAX-PHI. INC.)
X-ray source: Monochromatic Al Kα(1486.6 eV)
X-ray beam diameter: 100 μmφ, (25 W, 15 kV)
Measuring range: 100 μm×300 μm
Signal capture angle: 45°
Electrostatic charge neutralization conditions: neutralizing electron gun, Ar+ ion gun
Vacuum degree: $1 \times 10^{-6}$ Pa
Measuring elements (peak of excited inner shell atoms used for quantification): C (1s), N (1s), O (1s), F (1s), Na (1s), Si (2p), P (2p), S (2p)

The obtained spectrum is analyzed to find the ratio of the fluorine element to the total amount of elements of the film surface.

(1-2) Analysis of Ratio of the Fluorine Element to the Total Amount of Elements at 0.1 μm Deep from the Surface In an XPS analysis apparatus, once the film is etched until a depth of 0.1 μm using C60, element content at 0.1 μm film depth is quantified so as to calculate the ratio of the fluorine element to the total amount of elements under the same conditions described above.

(Etching Conditions)
Measurement condition: acceleration voltage 10 kV
Sample current: 20 mA
Scanning field: 0.5 mm×2.0 mm
Etching rate: 1.0 nm/min (2) Evaluation of Detachability from Support When forming the water-soluble film, detached state of the film from the support is visually observed and evaluated according to the following criteria.

Detachability Evaluation Criteria:
A . . . Detach positions are horizontal along the width, and there are no creases nor stretches generated in the film surface.
B . . . Detach positions are horizontal along the width, but there are creases and stretches generated in the film surface.
C . . . Detach positions wave along the width, and there are creases and stretches generated in the film surface.

(3) Evaluation of Sealing Property

Sealing property between film surfaces having a low ratio of the fluorine element to the total amount of elements is evaluated.

(3-1) Preparation

Two oblong test pieces of a water-soluble film, each having dimensions of approximately 30 cm in the flow direction (MD) of film formation and approximately 10 cm along the width (TD), are cut out for each sample, and kept for 16 hours in an environment of 10° C. and 35% RH (Relative Humidity).

(3-2) Bonding Films Together

One piece of the pre-prepared films is placed on a stand in the environment of 10° C. and 35% RH, and the four corners of the film are fixed using adhesive tape. One more piece of the film is stacked thereupon, both ends of respective 10 cm sides are fixed using adhesive tape, and the unfixed ends are passed through an ESIPROOF proofing roller using a 140/10 anilox roller. 0.5 mL of deionized water is poured on a doctor blade of the ESIPROOF proofing roller, and the roller is pulled at a speed of approximately 7.5 cm/sec, bonding the two films together. Note that at this time, since the roller is set to the chuck of a tension tester without being pulled to the end of the film, a part not bonded to the end of the film is left. Three short strip test pieces having a width of 25 mm in MD are cut out from the bonded water-soluble film (3-3) Measurement of Seal Strength Once the test pieces are bonded and left for ten minutes, they are set in a tension tester, peeled in conformity to a T-peel test based on JIS K6854-3: 1999, and the average value of detaching force of the three obtained test pieces is taken as the adhesive force. Measurement condition for this test is an elastic stress rate of 30 mm/min.

Evaluation Criteria:
 A . . . Excellent sealing property . . . seal strength standard: exceeds 5N/25 mm
 B . . . Slightly inferior sealing property . . . seal strength standard: 1 to 5N/25 mm
 C . . . Cannot seal . . . seal strength standard: less than 1N/25 mm (4) Evaluation of Transparency A liquid (pseudo detergent) dyed green is packaged inside of the respective films, and transparency is evaluated by visibility of content.

Evaluation Criteria:
 A . . . Transparency is excellent, and can clearly see through . . . Standard: overall haze value is 50% or less
 B . . . There is slight cloudiness, but can clearly see through . . . Standard: overall haze value is 50 to 70%
 C . . . Film looks cloudy and is opaque, and cannot see through clearly . . . Standard: overall haze value is 70% or greater (5) Evaluation of Film Adhesion The water-soluble FVA film is cut out to a size of 3 cm×20 cm, rolled on a short end as a pivot into a cylindrical form having an inner diameter of approximately 1 cm, and then has both end parts cut off. This forms a small water-soluble film roll having an inner diameter of 1 cm and width of 1 cm. A double clip (product name Scel-bo manufactured by Kokuyo Co., Ltd. 'Scel-bo' is a registered trademark of Kokuyo Co., Ltd.) having an aperture width of 15 mm is used to clasp near the central axis of the obtained roll such that the direction of the clasping portion of the clip corresponds to the axial direction of the roll, and the roll is then stored for 16 hours under the conditions of 60° C. and 90% RH. The stored film roll is unwound, and the degree of adhesion between contact surfaces at the ends is evaluated.

Evaluation Criteria:
 A . . . There is no adhesion between contact surfaces at the ends, and the water-soluble film has been unwound without resistance.
 B . . . There is resistance when unwinding, but the water-soluble film has been unwound due to added force.
 C . . . There is adhesion between contact surfaces at the ends, and the water-soluble film has not been unwound.

<Working Example 1>

A metal drum (first drying roller), which will be a film forming support, is continuously coated with a 0.1 mass % aqueous dispersion including fluoroalkyl alcohol (fluorotelomer alcohol: may be referred to as FTOHs hereafter) as the fluorine-containing surfactant using a roll coater so that 2.5 g/m² aqueous dispersion is accumulated, hot air of 80° C. is blown on it to dry, and the metal drum surface is continuously coated with FTOHs.

Subsequently, a film forming solution 60 mass % in volatile component rate is prepared, where the film forming solution is constituted by: 100 parts mass methyl maleate (may be referred to as MA hereafter) modified PVA (saponification degree of 99.9 mol %, polymerization degree of 1700, and MA modification degree of 5 mol %) obtained by saponifying polyvinyl acetate; 50 parts mass glycerine as a plasticizer; 2.0 parts mass diethanolamide laurate as a surfactant; and water, and is then filtered so as to obtain a film forming solution. The obtained film forming solution is continuously sprayed in film form on the first drying roller (at surface temperature of 80° C.) that is coated with FTOHs output from a T-die, and hot air of 85° C. is blown onto the entire open surface on the first drying roller at a speed of 5 m per second so as to dry it. Next, it is detached from the first drying roller, and is dried using a second drying roller and subsequent ones at a roller surface temperature of 75° C., with either the open surface or the support surface making physical contact with each of the drying rollers alternately, and is wound by a winding tension of 90 N/m, resulting in generation of a water-soluble film 35 μm in depth and 1200 μm in width.

As results of taking a sample of the water-soluble film from the obtained film roll and measuring the amount of the fluorine element using XPS, F1S is 16.7 mol %, F1B is a lower detection limit or less (<0.1 mol %), F2S is 9.4 mol %, and F2B is the lower detection limit or less (<0.1 mol %). Evaluation results of detachability from the metal drum, sealing property, visibility of content, and film adhesion are all favorable.

<Working Example 2>

Aside from using MA modified PVA having a saponification degree of 88 mol %, a water-soluble film is obtained in the same manner as in Working Example 1.

<Working Example 3>

Aside from using 30 parts mass of plasticizer, a water-soluble film is obtained in the same manner as in Working Example 1.

<Working Example 4>

Aside from using monomethyl maleate (may be referred to as MMM hereafter) modified PVA having a modification rate of 2 mol % and a saponification degree of 88 mol %, and using 25 parts mass of plasticizer, a water-soluble film is obtained in the same manner as in Working Example 1.

<Working Examples 5 and 6>

Aside from using perfluoroalkyl sulfonate salt and tris(2, 2,2-trifluoroethyl) phosphate as the fluorine-containing surfactant, respectively, water-soluble films are obtained in the same manner as in Working Example 1.

<Working Examples 7 and 8>

Aside from coating the first drying roller with 1.1 g/m² and 8.1 g/m² aqueous dispersions of the fluorine-containing surfactant, respectively, water-soluble films are obtained in the same manner as in Working Example 4.

<Working Example 9>

Aside from continuously coating the second drying roller, with which the open surface is making physical contact, with the aqueous dispersion of FTOHs, as with the first drying roller, a water-soluble film is obtained in the same manner as in Working Example 1.

<Comparative Example 1>

Aside from coating with 24.6 g/m² aqueous dispersion of the fluorine-containing surfactant, a water-soluble film is obtained in the same manner as in Working Example 1. F1S of this film is 38.5 mol % and F1B is 1.2 mol %, and while detachability from the drum is favorable, sealing property is poor.

<Comparative Example 2>

Aside from drying using only remaining heat from the first drying roller without hot air drying after being coated with the aqueous dispersion of the fluorine-containing surfactant, a water-soluble film is obtained in the same manner as in Working Example 1. F1S of this film is 5.6 mol %, F1B is 3.2 mol %, and detachability from the drum is poor.

<Comparative Example 3>

Instead of coating with the fluorine-containing surfactant every cycle, a fluorine resin coating is applied by coating the roll with an ethanol solution of fluorine-containing resin (dichloropentafluoropropane (HCFC-225)) and then drying it. Otherwise, a water-soluble film is obtained in the same manner as in Working Example 1. Detachability of the film is excellent; however, when unwinding the film roll, films adhere to each other and adhere inside of a carrying roller, thereby generating creases in the film <Comparative Examples 4 and 5>

Instead of coating with the fluorine-containing surfactant, FTOHs is added to the PVA film forming solution so as to reach 5000 ppm and 100 ppm, thereby forming films Otherwise, water-soluble films are obtained in the same manner as in Working Example 1. While detachability of these films is favorable in Comparative Example 4, it is poor in Comparative Example 5. Both of these films have poor transparency, resulting in cloudy films.

The evaluation results of the obtained films are given in Table 1.

The invention claimed is:

1. A water-soluble film comprising:
polyvinyl alcohol resin,
wherein the ratio of fluorine element to the total amount of elements (F1S) found at the time of analyzing a first surface of the water-soluble film through X-ray Photoelectron Spectroscopy is 1 mol % or greater and 23 mol % or less,
the ratio of the fluorine element to the total amount of elements (F1B) found at the time of analyzing a surface 0.1 μm deep from the first surface through X-ray Photoelectron Spectroscopy is 0.5 mol % or less,
the ratio of fluorine element to the total amount of elements (F2S) found at the time of analyzing a second surface opposite the first surface of the water-soluble film through X-ray Photoelectron Spectroscopy is 1 mol % or greater and 23 mol % or less, and
a difference between the F1S and the F2S does not exceed 22 mol %.

2. The water-soluble film according to claim 1, wherein the ratio of fluorine element to the total amount of elements (F2B) found at the time of analyzing a surface 0.1 μm deep from the second surface through X-ray Photoelectron Spectroscopy is 0.5 mol % or less.

TABLE 1

| | | Working Examples | | | | | | | | | Comparative Examples | | | | |
|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 |
| Modified | Type | MA | MA | MA | MMM | MA | MA | MMM | MMM | MA | MA | MA | MA | MA | MA |
| | Degree of modification [mol %] | 5 | 5 | 5 | 2 | 5 | 5 | 2 | 2 | 5 | 5 | 5 | 5 | 5 | 5 |
| Saponification degree [mol %] | | 99.9 | 85 | 99.9 | 88 | 99.9 | 99.9 | 88 | 88 | 99.9 | 99.9 | 99.9 | 99.9 | 99.9 | 99.9 |
| Plasticizer [mass %/PVA] | | 50 | 50 | 30 | 25 | 50 | 50 | 25 | 25 | 50 | 50 | 50 | 50 | 50 | 50 |
| Fluorine-containing surfactant | Type* | A | A | A | A | B | C | A | A | A | A | A | D | A | A |
| | First drying roll coated amount [g/m²] | 2.5 | 2.5 | 2.5 | 2.5 | 2.5 | 2.5 | 1.1 | 8.1 | 2.5 | 24.6 | 2.5 | 0 | 0 | 0 |
| | Contained amount in film [ppm/PVA] | 0 | 0 | 0 | 0 | 0 | 0 | 0 | 0 | 0 | 0 | 0 | 0 | 5000 | 100 |
| | First drying roller hot air drying | Yes | Yes | Yes | Yes | Yes | Yes | Yes | Yes | Yes | Yes | No | Yes | Yes | Yes |
| | Coating second drying roller | — | — | — | — | — | — | — | — | Yes | — | — | — | — | — |
| Ratio of fluorine to total amount of elements [mol %] | F1S | 16.7 | 15.5 | 17.5 | 13.6 | 20.2 | 19.4 | 5.6 | 23.5 | 21.3 | 38.5 | 5.6 | 0.2 | 23.5 | 0.8 |
| | F1B | <0.1 | <0.1 | <0.1 | <0.1 | <0.1 | <0.1 | <0.1 | 0.3 | <0.1 | 1.2 | 3.2 | <0.1 | 20.8 | 0.3 |
| | F2S | 9.4 | 7.9 | 10.1 | 0.8 | 8.1 | 6.9 | 1.8 | 13.9 | 19.2 | 22.1 | 1.1 | <0.1 | 22.7 | 0.7 |
| | F2B | <0.1 | <0.1 | <0.1 | <0.1 | <0.1 | <0.1 | <0.1 | 0.2 | <0.1 | <0.1 | <0.1 | <0.1 | 18.2 | 0.5 |
| | \| F1S − F2S \| | 7.3 | 7.6 | 7.4 | 12.8 | 12.1 | 12.5 | 3.8 | 9.6 | 2.1 | 16.4 | 4.5 | 0.2 | 0.8 | 0.1 |
| Detachability evaluation | | A | A | A | A | A | A | A | A | A | A | C | C | A | C |
| Sealing property | Evaluation | A | A | A | A | A | A | A | B | B | C | B | A | C | A |
| | Seal strength [N/25 mm] | 18.1 | 10.5 | 11.5 | 20.9 | 29.5 | 7.5 | 27.5 | 5.4 | 4.6 | 0.5 | 6.4 | 24.4 | 1.4 | 24.4 |
| Transparency evaluation | | A | A | A | A | A | A | A | A | A | A | A | A | C | B |
| Film adhesion evaluation | | A | A | A | B | A | A | B | A | A | A | B | C | A | C |

*A = FTOHs, B = Perfluoroalkyl sulfonate salt, C = Tris(2.2.2-trifluoroethyl) phosphate, D = Dichloropentafluoropropane From the results given above, the water-soluble film of the present invention has excellent detachability from the support as well as excellent sealing property and transparency. Adhesion of the films is also controlled. Since the water-soluble film of the present invention has excellent sealing property and transparency, it may be suitably used as chemical package films, base films for hydraulic pressure transfer, base films for embroidery, release films for artificial marble molding, seed package films, and films for waste storage bags. In particular, the water-soluble film of the present invention may be used as a chemical package film for chemicals such as pesticides, cleansers (including bleach), or disinfectants.

3. The water-soluble film according to claim 2, wherein the difference between the F1S and the F2S is 2.5 mol % or greater and does not exceed 22 mol %.

4. The water-soluble film according to claim 1, wherein the fluorine element is contained in a fluorine-containing surfactant having a molecular weight of 10,000 or less.

5. The water-soluble film according to claim 4, wherein the fluorine-containing surfactant is at least one type selected from a group consisting of fluoroalkyl alcohol, fluoroalkyl carboxylate, fluoroalkyl sulfate ester, fluoroalkyl sulfonate, fluoroalkyl phosphoric ester salt, fluoroalkyl phosphonate, fluoroalkyl phosphonous salt, and fluoroalkyl ammonium salt.

6. The water-soluble film according to claim 5, wherein the fluorine-containing surfactant is at least one type selected from a group consisting of fluoroalkyl alcohol, fluoroalkyl phosphoric ester salt, and fluoroalkyl sulfonate.

7. The water-soluble film according to claim 4, comprising a layer containing the polyvinyl alcohol resin without the fluorine-containing surfactant.

8. The water-soluble film according to claim 4, comprising a layer containing the fluorine-containing surfactant without the polyvinyl alcohol resin.

9. A packaging body comprising:
a water-soluble film including polyvinyl alcohol resin,
wherein the packaging body is configured to store a chemical,
the ratio of fluorine element to the total amount of elements (F1S) found at the time of analyzing a first surface of the water-soluble film through X-ray Photoelectron Spectroscopy is 1 mol % or greater and 23 mol % or less,
the ratio of the fluorine element to the total amount of elements (F1B) found at the time of analyzing a surface 0.1 µm deep from the first surface through X-ray Photoelectron Spectroscopy is 0.5 mol % or less,
the ratio of fluorine element to the total amount of elements (F2S) found at the time of analyzing a second surface opposite the first surface of the water-soluble film through X-ray Photoelectron Spectroscopy is 1 mol % or greater and 23 mol % or less, and
a difference between the F1S and the F2S does not exceed 22 mol %.

10. The packaging body according to claim 9, wherein the chemical is a pesticide, a detergent, or a disinfectant.

11. The packaging body according to claim 9, wherein the chemical is in a liquid state.

12. The packaging body according to claim 9, wherein the ratio of fluorine element to the total amount of elements (F2B) found at the time of analyzing a surface 0.1 µm deep from the second surface through X-ray Photoelectron Spectroscopy is 0.5 mol % or less.

13. The packaging body according to claim 12, wherein a difference between the F1S and the F2S is 2.5 mol % or greater and does not exceed 22 mol %.

14. The packaging body according to claim 9, wherein the fluorine element is contained in a fluorine-containing surfactant having a molecular weight of 10,000 or less.

15. The packaging body according to claim 14, wherein the fluorine-containing surfactant is at least one type selected from a group consisting of fluoroalkyl alcohol, fluoroalkyl carboxylate, fluoroalkyl sulfate ester, fluoroalkyl sulfonate, fluoroalkyl phosphoric ester salt, fluoroalkyl phosphonate, fluoroalkyl phosphonous salt, and fluoroalkyl ammonium salt.

16. The packaging body according to claim 15, wherein the fluorine-containing surfactant is at least one type selected from a group consisting of fluoroalkyl alcohol, fluoroalkyl phosphoric ester salt, and fluoroalkyl sulfonate.

17. A water-soluble film comprising:
polyvinyl alcohol resin,
wherein the ratio of fluorine element to the total amount of elements (F1S) found at the time of analyzing a first surface of the water-soluble film through X-ray Photoelectron Spectroscopy is 1 mol % or greater and 25 mol % or less,
wherein the ratio of the fluorine element to the total amount of elements (F1B) found at the time of analyzing a surface 0.1 µm deep from the first surface through X-ray Photoelectron Spectroscopy is 0.5 mol % or less,
wherein the ratio of fluorine element to the total amount of elements (F2S) found at the time of analyzing a second surface opposite the first surface of the water-soluble film through X-ray Photoelectron Spectroscopy is 1 mol % or greater and 25 mol % or less,
wherein the ratio of fluorine element to the total amount of elements (F2B) found at the time of analyzing a surface 0.1 µm deep from the second surface through X-ray Photoelectron Spectroscopy is 0.5 mol % or less, and
wherein a difference between the F1S and the F2S is 2.5 mol % or greater.

18. A packaging body comprising:
a water-soluble film including polyvinyl alcohol resin,
wherein the packaging body is configured to store a chemical,
wherein the ratio of fluorine element to the total amount of elements (F1S) found at the time of analyzing a first surface of the water-soluble film through X-ray Photoelectron Spectroscopy is 1 mol % or greater and 25 mol % or less,
wherein the ratio of the fluorine element to the total amount of elements (F1B) found at the time of analyzing a surface 0.1 µm deep from the first surface through X-ray Photoelectron Spectroscopy is 0.5 mol % or less,
wherein the ratio of fluorine element to the total amount of elements (F2S) found at the time of analyzing a second surface opposite the first surface of the water-soluble film through X-ray Photoelectron Spectroscopy is 1 mol % or greater and 25 mol % or less; and the ratio of fluorine element to the total amount of elements (F2B) found at the time of analyzing a surface 0.1 µm deep from the second surface through X-ray Photoelectron Spectroscopy is 0.5 mol % or less, and
wherein a difference between the F1S and the F2S is 2.5 mol % or greater.

19. A method of forming the water-soluble film of claim 1, comprising the step of coating a support with a fluorine-containing surfactant, and flow-casting a film forming solution containing the polyvinyl alcohol resin in film form on the resulting coated support, wherein the fluorine element is contained in the fluorine-containing surfactant having a molecular weight of 10,000 or less.

20. The method according to claim 19, wherein the support is coated with the fluorine-containing surfactant by continuously coating the support with a solution of the fluorine-containing surfactant or an aqueous dispersion of the fluorine-containing surfactant, and drying the resulting coated support.

* * * * *